United States Patent [19]

Stencel

[11] 3,921,687
[45] Nov. 25, 1975

[54] TAMPER-PROOF NUT COVER

[75] Inventor: Edgar L. Stencel, Huntington Beach, Calif.

[73] Assignee: VSI Corporation, Pasadena, Calif.

[22] Filed: Jan. 28, 1974

[21] Appl. No.: 436,965

[52] U.S. Cl. .............................................. 151/41.73
[51] Int. Cl.² ........................................ F16B 39/00
[58] Field of Search ................ 151/41.73, 41.7, 69; 85/53, 55, 32 K, 35

[56] References Cited
UNITED STATES PATENTS

| 2,877,817 | 3/1959 | Rockwell | 151/41.7 X |
| 3,078,900 | 2/1963 | Walker | 151/41.73 |
| 3,451,455 | 6/1969 | Parkin | 151/41.73 |

FOREIGN PATENTS OR APPLICATIONS

| 623,840 | 7/1961 | Canada | 85/35 |
| 1,315,137 | 12/1962 | France | 151/41.73 |

Primary Examiner—Ramon S. Britts
Attorney, Agent, or Firm—Christie, Parker & Hale

[57] ABSTRACT

A nut cover has a cup-shaped head with an axial passage passing the threads of a standard bolt. Spikes depend axially from the head and are driven into a post with the head of the cover receiving a nut threaded on the bolt. Lateral projections on the spikes resist pulling the cover from the post.

8 Claims, 4 Drawing Figures

TAMPER-PROOF NUT COVER

BACKGROUND OF THE INVENTION

The present invention relates to the art of fastening in general and, more in particular, to means for preventing the disassembly of a nut and bolt combination by covering the wrenching flats thereof.

Highway signs and road markers are subject to theft because of the manner in which they are mounted to their posts. The posts are typically wooden and the signs and markers are attached to the posts by standard nut and bolt combinations. The nut and bolt can easily be removed by standard tools and the sign taken away.

Obviously there is a need for securing such items as signs against undesired removal while maintaining the ease of mounting them in the first place.

SUMMARY OF THE INVENTION

The present invention provides a means for preventing tampering with a standard nut and bolt combination thereby preventing the unauthorized taking of such items as road signs fastened to posts by nuts and bolts.

Briefly, the present invention contemplates a cover for masking the wrenching flats of a nut and bolt combination. the cover has spikes depending axially from a head. The spikes secure the cover into a wooden post. An axial passage in the head passes the threaded end of a bolt. Preferably, there are at least three equally spaced spikes. At least three spikes give the cover stability during driving into a post. Preferably the spikes have lateral projections to give the cover additional resistance to pullout forces. The head is hollow for receiving the wrenching flats of a standard hex nut. The exterior surface of the head is smooth and continuously curved to resist effective application of a wrenching tool. The exterior surface of the head is preferably tapered to prevent purchase by a wrenching tool such as pliers. The head also has a cylindrical section between the tapered section and the spikes to receive the majority of a nut and washer.

An alternate embodiment of the cover does not have the tapered head. It is preferably used in a counterbored hole in a post with the cover entirely within the bore and over a nut of the protected nut and bolt combination.

The present invention contemplates the combination of the nut cover, a nut, a bolt, a post, and a fastened object. The bolt preferably does not have exposed wrenching means, such as flats, and may be of the type such as, for example, a standard round head, square-necked bolt. As is standard, the square cross section of the bolt is adapted to be received in a non-circular hole of the object being secured with interference between the neck of the bolt and the object to prevent rotation of one with respect to the other.

These and other features, aspects and advantages of the present invention will become more apparent from the following description, appended claims and drawings.

DESCRIPTION OF THE PREFERRED EMBODIMENTS

Figure 1:
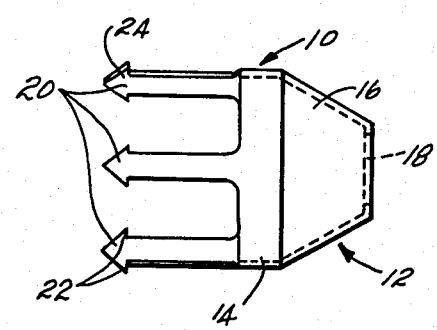
FIG. 1 is a perspective view of the presently preferred nut cover of the present invention.

FIG. 1 shows a nut cover 10 in accordance with the preferred embodiment of the present invention. The nut cover has a head 12 which includes an axially extending skirt 14 capped by a frusto-conical section 16. The tapered exterior surface of section 16 prevents purchase by a wrenching tool, such as a pair of pliers or a monkeywrench. As will be developed, cylindrical skirt 14 is driven into the wood of a post. Head 12 is hollow for receipt of the nut on the nut side of a joint. The head has an axial passage 18 for the threaded end of a bolt of a joint. The passage has an axis which is coaxial with the longitudinal axis of the cover. Three equally spaced spikes 20 depend axially from skirt 14. These spikes are to imbed in wood or the like to secure the cover in place. The spikes have lateral projections 22 at their heads to resist pullout of the cover from a post because of interference of the wood of the post with the projections. The projections for each spike are defined generally by an arrow-shaped head 24 of the spike. The heads come to a point to facilitate driving of the nut cover into a post.

The provision of at least three spikes gives the nut cover axial stability during its driving into a post, that is, it is stable against displacement off the line of drive.

Figure 2:
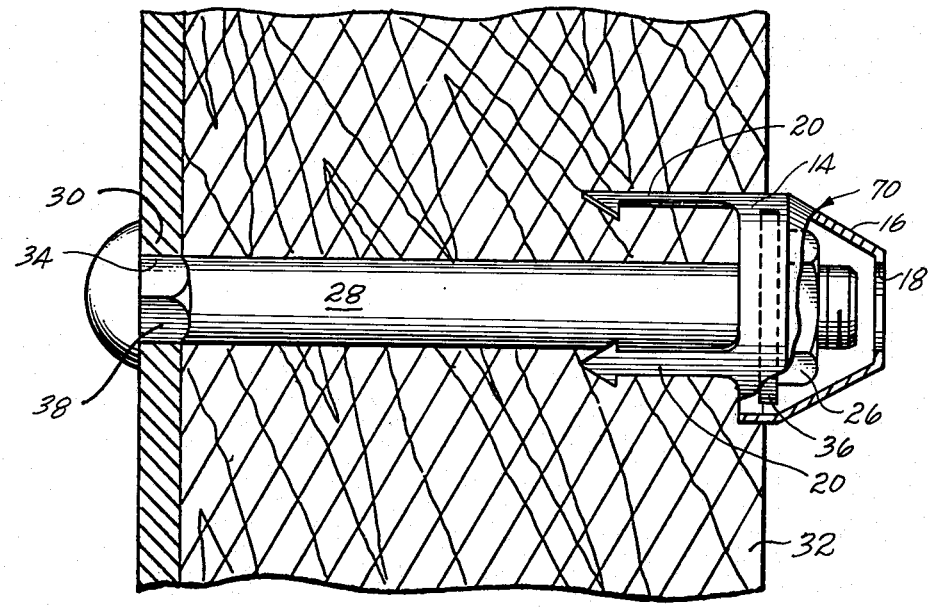
FIG. 2 is an elevational view, partly in section, of a nut cover, a post and a sign combination in accordance with the present invention.

FIG. 2 illustrates the preferred nut cover as it would appear in combination with a nut 26, a bolt 28, an object to be fastened 30 (say, a sign) and a post 32. Bolt 28 extends through a hole 34 in sign 30 and post 32 and egresses on the nut side of the post. Nut 26 engages the threads of the bolt. To give good bearing against the post a washer 36 acts between the post and the nut. The bolt is preferably a standard round-headed bolt which may have a square neck 38 for rotational interference with a complementary hole in the sign. Other than the nut cover, what has been described thus far in this paragraph is standard. Nut cover 10 is driven into post 32 as by a hammer. In the event that the threaded end of bolt 28 extends through passage 18 prior to the driving of the nut cover, all that is necessary to effect a good drive is a sleeve or cylinder receiving the threaded end of the bolt and bearing on the end of the cover to transmit the driving force to the head of the cover. As is evident from the Figure, cylindrical section 14 imbeds in the post as well as the spikes. The frusto-conical end of the nut cover encloses and protects the wrenching flats of nut 26 from unauthorized tampering.

Figure 3:
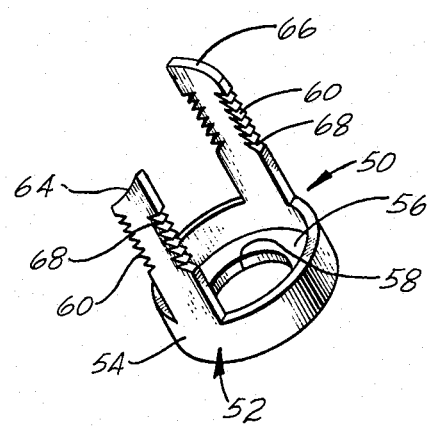
FIG. 3 is a perspective view of an alternate embodiment of the nut cover of the present invention.

FIG. 3 shows a nut cover 50 in accordance with an alternate embodiment of the present invention. The nut cover has a head 52 which has an axially extending skirt 54. The head has a washer-shaped, radially extending wall 56 which meets and merges into the skirt at an axial end of the latter. A passage 58 along the longitudinal axis of the cover extends through wall 56. The passage is for the threaded end of a bolt to pass through the cover. A pair of diagonally opposed, axially extending spikes 60 depend from the end of skirt 54 opposite wall 56. These spikes are to imbed in wood or the like to secure the cover in place. Leading edges 64 and 66 for spikes 60 are at acute angles to the line of the spikes but slant in opposite directions from each other. The slanting facilitates driving the cover into a post by resisting forces which would tend to move the cover off its axis while still having the piercing facility of points defined by the leading and vertical edges of the spikes.

Preferably the spikes have serrated or barbed vertical edges such as shown at 68. These barbs resist pullout forces acting on the cover.

Figure 4:
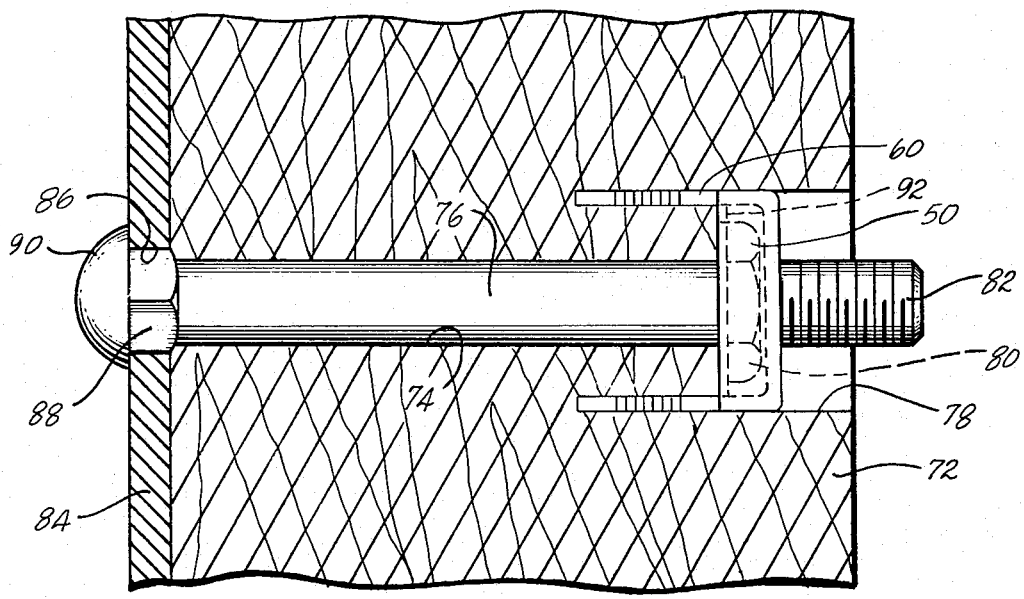
FIG. 4 is an elevational view, mostly in section, of the nut cover of FIG. 3, a post, and a sign combination in accordance with the present invention.

FIG. 4 illustrates cover 50 in a typical application. A post 72 of wood is bored at 74 for receiving a bolt 76. A counterbore 78 in post 72 is coaxial with bore 74. A standard hex nut 80 is received on threads 82 of bolt 76. A sign 84 flush against one side of post 72 has a square passage 86 for receiving a complementary square neck 88 of bolt 76 in rotational interference. Bolt 76 has a standard round head 90. Thus, the head of bolt 76 presents no wrenching surfaces or means on the outside of sign 84.

Nut cover 50 is received over nut 80 with spikes 60 driven into post 72. The nut cover is quite easily mounted. It can be driven into a post with the aid of a hollow cylinder bearing on the end wall of the cover and with a hammer for striking the cylinder. The cover is within counterbore 78. It is not necessary to have counterbore 78 and cover 50 received within it, but it is preferred. The reason for the preference is that it is more difficult to remove the cover when it, itself, is protected by the post. Again there is a bearing washer 92 between the post and the nut.

In an exposed use, skirt 54 protects the wrenching flats of the nut. In addition, the skirt makes the cover considerably stronger than would be the case if axially depending spikes came directly from wall 56.

The present invention has been described with reference to certain preferred embodiments. The spirit and scope of the appended claims should not, however, necessarily be so limited.

What is claimed is:

1. A nut cover for the prevention of tampering with a nut and bolt combination comprising:
    a. a head having a hollow interior for receiving a nut, a smooth, constantly curving exterior surface to present a surface incapable of easily accepting a wrenching tool, and a passage through an axial end of the head for passing the threaded end of the bolt through the cover, the passage having a diameter no greater than the maximum outside diameter of the nut;
    b. a hollow skirt integral with and axial to the head opposite the passage, the hollow interiors of the head and the skirt having diameters greater than the maximum diameter of the nut; and
    c. at least two spikes extending axially from the skirt for imbedding in wood and the like to secure the nut cover in place.

2. The improvement claimed in claim 1 wherein each of the spikes has lateral projections on its edges for imparting pullout resistance to the cover.

3. The improvement claimed in claim 1 wherein there are at least three spikes, each spike being spaced from the others so that the cover has axial stability during its driving into wood and the like.

4. The improvement claimed in claim 3 wherein each of the spikes has an arrow-shaped head with the base of the head defining lateral projections to impart pullout resistance to the cover.

5. The improvement claimed in claim 2 wherein:
    the spikes are two in number and diagonally opposed and each of the spikes has an angled leading edge with the angle of the leading edge of one of the spikes being in the opposite direction from the angle of the leading edge of the other of the spikes, the opposing angles of the leading edges imparting axial drive stability to the cover; and
    the head is defined by a cylindrical skirt, the spikes extending from the skirt, and a radial wall at the axial end of the head opposite the spikes, the radial wall having the passage for the threaded end of a bolt.

6. The nut cover claimed in claim 1 wherein the head has a frusto-conical exterior surface for the prevention of gripping by a wrenching tool.

7. The nut cover claimed in claim 6 wherein there are at least three spikes, each spike being spaced from the others so that the cover has axial stability during setting.

8. The nut cover claimed in claim 4 wherein the head is defined by a cylindrical skirt with the spikes extending from the skirt, and a frusto-conical section capping the skirt and extending to the axial end of the cover opposite the spikes.

* * * * *